United States Patent Office 2,935,809
Patented May 10, 1960

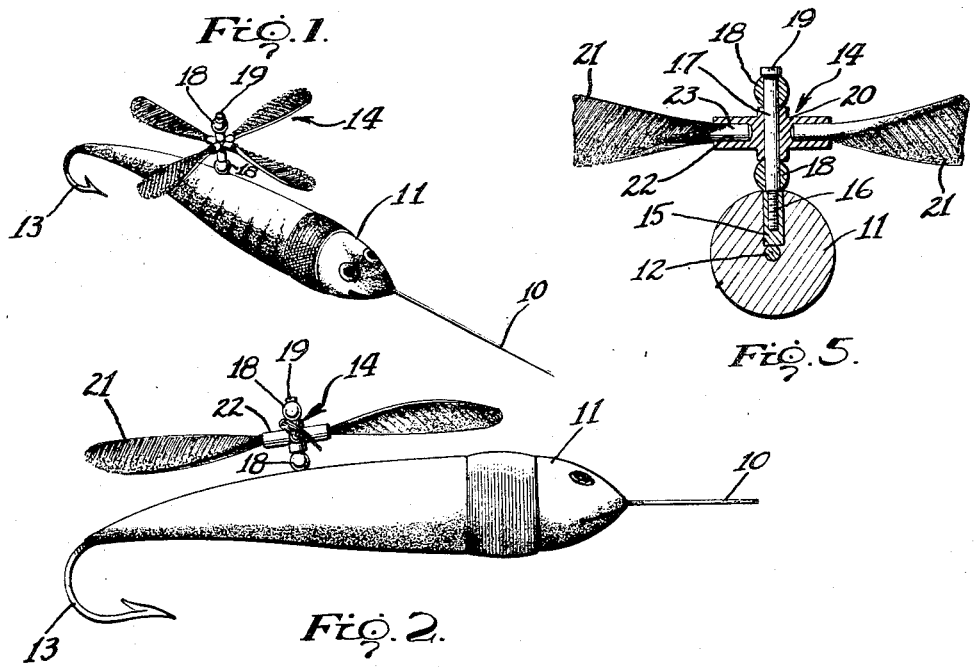
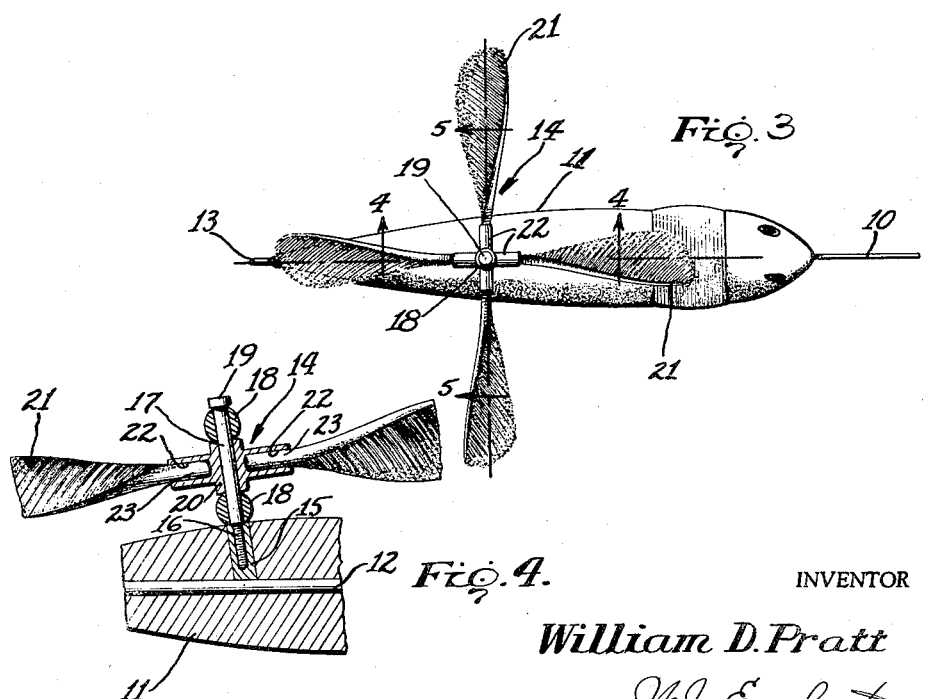

2,935,809

WINGED FISH LURE

William D. Pratt, Forest Park, Ga.

Application October 6, 1958, Serial No. 765,684

1 Claim. (Cl. 43—42.13)

(Granted under Title 35, U.S. Code (1952), sec. 266)

The invention described herein, if patented, may be manufactured and used by or for the Government for governmental purposes, without the payment to me of any royalty thereon.

The invention relates to fish lures and more particularly to lures which simulate winged insects and which lures are known as flies. Such lures are cast by means of a fishing pole and are intended to simulate the lighting of a fly or other winged insect on the water. However, because the lure must necessarily include a hook with a line attached thereto, the assembly is heavier than the fly simulated whereby it descends much faster, hits the water with more splash and thereby destroys the illusion of a live insect and detracts from the effectiveness of the lure. Only the most skillful fisherman can so cast a fly that it bears a close resemblance to the action of the insect simulated thereby.

With the foregoing in view, it is an object of the invention to provide an improved winged fish lure of the class described.

A further object is to provide an improved fish lure which will simulate the flight of an insect even though cast by an unskillful angler.

A further object is to provide a winged fish lure wherein the wings are mounted for free rotation relative to the body of the lure as the same is cast whereby to retard the flight of the lure by an action analogous to that of the wings or rotor of an autogyro.

Other objects and advantages reside in the particular structure of the lure, the structure of the several elements comprising the same, combinations and subcombinations of such elements, all of which will be readily apparent to those skilled in the art upon reference to the attached drawing showing one species of the invention in connection with the following specification wherein the invention is described and claimed.

In the drawing:

Figure 1 is a perspective view of a lure according to the invention;

Figure 2 is an elevational view of the same on an enlarged scale;

Figure 3 is a plan view thereof; and

Figure 4 and Figure 5 are enlarged, fragmentary, vertical sectional views taken respectively on the planes of the lines 4—4 and 5—5 of Figure 3.

Referring specifically to the drawing wherein like reference characters designate like parts in all views, 10 designates any suitable fishing line which is attached in any suitable manner to any typical lure body 11 which preferably simulates the body of a flying insect. The lure body 11 has a hook shank 12 disposed therein which includes the usual hook portion 13 which is disposed outwardly of the lure body. It is considered that in normal usage, the lure body 11 will be horizontal and that the hook portion 13 will extend downwardly of the same and the shank 12. As so far described, the structure is conventional and forms no part of the invention apart from any combination claimed hereinafter. The usual lure of this type has simulated wings secured thereto in the region of the front end of the lure body and extending rearwardly and upwardly thereof. Such wings are generally fixed and have no movement in flight other than a slight flexing which is inherent in the lightweight material used.

In the species of invention illustrated and in place of such conventional wings, there has been provided a wing assembly which is generally indicated at 14 and which is disposed above the lure body 11 and mounted for free rotation relative to such body. In the embodiment illustrated, a base element 15 is fixed to the hook shank 12 in any suitable manner, as by welding, and extends therefrom at an angle thereto. A stub shaft 17 is mounted on the base 15 preferably so that it may be readily detached therefrom. Thus, in the species illustrated the base 15 is axially bored and tapped to receive the threaded inner end 16 of the stub shaft 17. Upper and lower antifriction bearing elements such as beads 18 are freely rotatable on the shaft 17 and retained thereon by the head 19 of such shaft. A hub 20 is freely rotatable on said shaft between the bearing elements 18. Hub 20 has mounted thereon any suitable wings 21 which preferably are so mounted that they may be readily replaced when damaged. In the form of the invention illustrated the hub 20 has a plurality of spoke sockets 22 extending radially thereof while the wings 21 have shank ends 23 which have friction fit in such sockets. Wings 21 are formed of feathers or like material and have a pitch in the nature of an autogyro wing or rotor. Obviously, other arrangements are considered to be within the scope of the invention as claimed.

Although, as illustrated, four wings 21 have been provided, it is considered that this number is not critical. Usually at least two symmetrically disposed wings will be necessary but any number greater than two will operate as long as they are evenly spaced about the axis of the hub 20. Indeed, it may even be desirable in some instances to provide uneven spacing of the wings 21 to procure an erratic flight which might be characteristic of a particular insect simulated.

Preferably the shaft 17 will extend from the shank 12 in a direction generally opposite from that in which the hook portion 13 extends. Thus, as the lure is cast, the weight of the hook will cause it to extend downwardly while the shaft 17 will extend upwardly so that the wing assembly 14 is disposed above the lure body 11. Thus, in use, as the lure is cast, the same will right itself in flight whereby the slip stream created by the cast will cause the wings to rotate and retard the flight in the same manner as do the wings or rotor of an autogyro. It is apparent, therefore, that the lure according to the invention will have a light, wind blown flight closely simulating that of a flying insect even when cast by an unskillful fisherman. Also, the rotation of the wings 21 will cause them to blur so that their true nature is not apparent in use.

It should be noted also, that as the lure is retrieved after an unsuccessful cast, the slip stream so created will again cause the wings 21 to rotate whereby to simulate the attempts of a trapped insect to rise from water whereby to attract fish to the lure.

The particular arrangement disclosed permits the pitch of the wings to be varied for faster or slower flight as desired. This is accomplished by shifting the shank ends 23 in the sockets 22. Also, the wings 21 may be readily removed and replaced by larger or smaller wings to create different effects and/or to simulate a variety of insects with but a single basic lure. Also, it is considered that to simulate certain insects, no lure body is necessary. Thus, by merely mounting the wings according to the invention on a bare hook shank, a lure will be obtained which is adequate for certain selected fish.

Moreover, while there has been shown and described what is now considered to be a preferred embodiment of the invention, it is understood that the same is susceptible of other forms and expressions. Therefore, I do not limit myself to the precise structure, arrangement and design shown and described hereinabove except as hereinafter claimed.

I claim:

In a casting fish lure including a downwardly extending hook having a generally horizontal shank, the improvement comprising a base member fixed to said shank, a stub shaft, means readily detachably mounting said stub shaft on said base member so as to extend upwardly from said shank at an angle, axially spaced antifriction bearings on said shaft, a hub freely rotatable on said shaft between said bearings, said hub including a plurality of sockets disposed radially about the same and said shaft, a plurality of wings, each wing having a shank end, said shank ends being sized to have frictional fits in said sockets, there being a shank end of a wing readily detachably seated in each of said sockets and said wings being sized and shaped to rotate in flight and support said lure in the manner of autogyro wings as said lure is cast.

References Cited in the file of this patent

UNITED STATES PATENTS

| | | |
|---|---|---|
| 633,726 | Manchester | Sept. 26, 1899 |
| 1,426,283 | Ewert | Aug. 15, 1922 |
| 2,244,032 | Timm | June 3, 1941 |
| 2,748,522 | Mulcahey | June 5, 1956 |